Oct. 24, 1961  A. BRODER ET AL  3,005,948
ENGINE ANALYZER
Filed Jan. 23, 1957  2 Sheets-Sheet 1

INVENTORS
ALAN BRODER
CARL M. MENGANI
BY
ATTORNEY

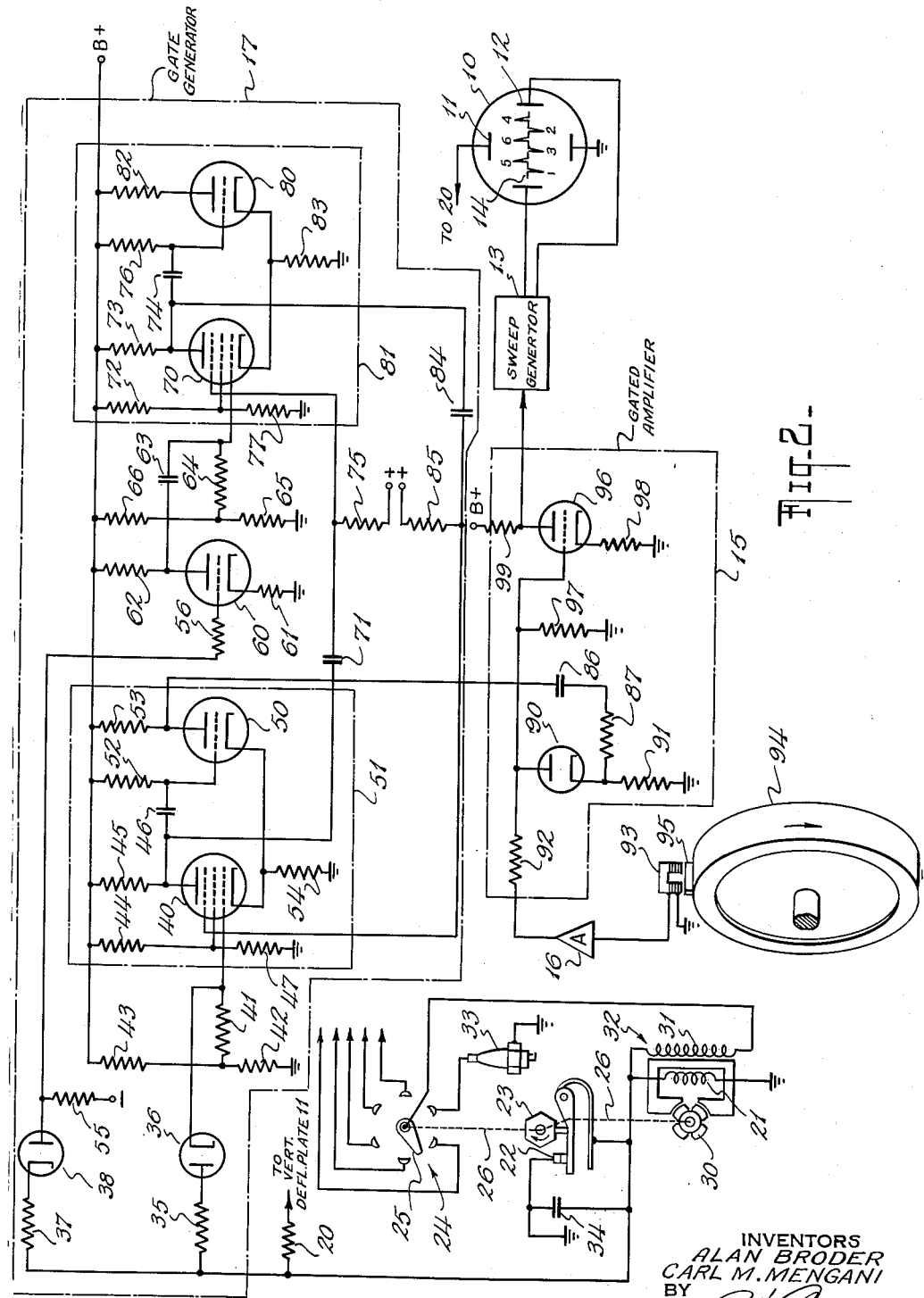

ated Oct. 24, 1961

**3,005,948
ENGINE ANALYZER**
Alan Broder, Glen Oaks, and Carl M. Mengani, New York, N.Y., assignors to Sperry Rand Corporation, a corporation of Delaware
Filed Jan. 23, 1957, Ser. No. 635,912
10 Claims. (Cl. 324—16)

This invention relates generally to engine analyzer systems and more specifically to means and methods for synchronizing and testing four-stroke cycle internal combustion engines without the addition of engine driven accessories.

Accurately synchronized electronic engine analyzers have in the past required either an engine driven timing device such as a synchronizing generator and/or access to the distributed ignition signals. The former is expensive and often complicated as the method of drive may present problems, and the latter is often difficult due to waterproofing, shielding and ignition circuit impedance requirements. The present invention overcomes the above objections and is also operative on engines where the ignition secondary circuits are inaccessible to instrumentation.

It is, therefore, an object of this invention to provide a trigger circuit synchronized by an ignition signal and an engine revolution synchronizing signal to produce a time base for an engine analyzer whereby the complete wave pattern of any cylinder or group of cylinders may be observed.

It is also an object of this invention to provide apparatus for synchronizing an engine analyzer to a particular engine cycle to initiate a sweep at a predetermined point of the engine cycle.

It is a further object of this invention to provide apparatus for synchronizing an engine analyzer with a particular internal combustion engine by means of ignition signals and engine revolution synchronizing signals whereby a characteristic ignition pattern is produced and may be observed.

It is another object of this invention to provide a synchronizing means for synchronizing an engine analyzer to an internal combustion engine whereby the sweep may always be initiated at the same point of each engine cycle.

Another object of the present invention is to provide a gate generating device that is only responsive to the initial polarity of a first signal and is rendered unresponsive to the subsequent polarity of a second signal where the subsequent polarity of the second signal is the same polarity as the initial polarity of the first signal whereby a gating signal is provided in accordance with the initial polarity of said first signal only.

It is a further object of this invention to provide methods for synchronizing an engine analyzer to particular engines without the addition of engine driven accessories.

The above objects are accomplished in the device herein set forth by initiating a sweep on a cathode ray tube by a trigger signal that is generated from a pick-up operably coupled to the engine to provide a synchronizing signal per revolution of the engine or per engine cycle. A satisfactory device, for example, would be a reluctance pick-up coupled to the flywheel of the engine, such flywheel having a discontinuity such as a vane or punch mark which would provide a synchronizing signal for each engine revolution. The synchronizing signal is synchronized with a particular signal from the magneto ignition system primary circuit which in a four-stroke cycle internal combustion engine will have, for example, a positive polarity every other firing, such that a given time relationship between the flywheel pick-up signal and the preceding positive ignition signal is obtained only once per engine cycle. The predetermined positive ignition signal is used as a gating signal to allow the flywheel pick-up signal to initiate the sweep on the cathode ray tube once every engine cycle. Having synchronized the analyzer to the engine in the aforesaid manner, characteristic engine operation signals, such as ignition signals, may be applied to the deflection plates of the cathode ray tube and on the face of the tube the characteristic engine operation pattern will be displayed.

As used herein "ignition signal" includes the actual electrical signal applied to the spark plugs and/or also the signal occurring in some part of the spark plug circuit, such as the primary of the ignition coil and resulting in such applied signal. It is well known that such an ignition signal may have both positive and negative polarity excursions from a base line. As used herein a "positive ignition signal" includes an ignition signal having an initial positive polarity although a subsequent excursion of the signal may be negative with respect to the base line, and a "negative ignition signal" indicates an ignition signal having an initially negative excursion from the base line, although it may have a subsequent positive excursion.

Other objects and advantages will occur to those skilled in the art from a consideration of the following specification taken in connection with the accompanying drawings, wherein like reference characters indicate like elements, in which, FIG. 1 is a block schematic diagram of an engine analyzing system embodying the principles of the present invention;

FIG. 2 is a detailed wiring schematic diagram of the engine analyzing system of FIG. 1;

Figure 1:
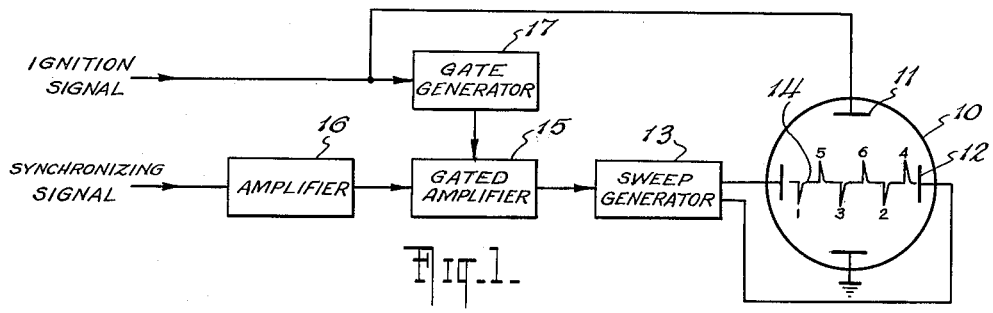

The principle by which a sweep is obtained for every other engine revolution is that the polarity of the ignition signal preceding the engine synchronizing signal will be of the same polarity only once per engine cycle, i.e. for every other engine revolution. Thus, on the basis of this relationship of the engine synchronizing signal to polarity of the ignition signal, a sweep for every other revolution may be triggered. In FIG. 1, the cathode ray tube 10 has vertical and horizontal deflection plates 11 and 12, respectively. Connected to one of the vertical deflection plates are the ignition signals from an internal combustion engine (not shown). The other vertical deflection plate may be grounded. Connected to the horizontal deflection plates 12 is a sweep generator 13 which provides a time base for the pattern 14 displayed on the face of the cathode ray tube 10. The sweep generator 13 is connected to the gated amplifier or coincidence circuit 15. The gated amplifier 15 is connected to an amplifier 16 that in turn is connected to receive a synchronizing signal for each engine revolution. The gated amplifier 16 is also connected to gate generator 17 which is connected to receive ignition signals.

Referring now to FIG. 2 which shows a detailed schematic wiring diagram of FIG. 1, the cathode ray tube 10 having vertical and horizontal deflection plates 11 and 12 is shown connected as indicated previously with its horizontal deflection plates 12 connected to sweep generator 13. The vertical deflection plates 11 are connected through resistor 20 to the magneto primary 21. The signals from the magneto primary 21 are initiated in a conventional manner by means of the engine ignition system comprising the breaker points 22 which are opened by the cam 23 of the distributor 24 which is rotated in synchronism with the distributor rotor 25 by means of the engine driven distributor shaft 26. The magneto rotor 30 is also rotated by the engine driven distributor shaft 26. The secondary coil 31 of magneto 32 is connected to ground through the primary coil 21 and is also connected to the distributor rotor 25 of distributor 24. The distributor 24 operates in an entirely conventional manner. The distributor shaft 26 is mechanically connected to the engine (not shown) and rotates with the engine at half engine speed thereby causing the cam 23 to open the points 22 to provide a spark to the distributor rotor 25. The distributor rotor 25 turns also, causing the spark to fire the respective spark plugs of which only spark plug 33 is shown for simplicity. One end of the primary 21 is connected to ground while the other end connects to the breaker points 22 and thence to ground. Connected across the breaker points 22 to prevent arcing is condenser 34. The primary 21 is also connected to the vertical deflection plates 11 of the cathode ray tube 10 through a suitable resistor 20.

One end of the primary 21 is also connected through resistor 35 to the plate of rectifier 36 and through resistor 37 to the cathode of rectifier 38. The cathode of rectifier 36 is connected to the control grid of pentode 40 and to one end of resistor 41. The other end of resistor 41 is connected to ground through resistor 42 and to a source of positive potential through resistor 43. The screen grid of pentode 40 is connected to positive potential through resistor 44 and to ground through resistor 47. The plate of pentode 40 is connected to positive potential through resistor 45 and is also connected through condenser 46 to the control grid of triode 50. The pentode 40 and the triode 50 and its associated circuitry form monostable multivibrator 51. The control grid of triode 50 is connected to positive potential through resistor 52. The plate of triode 50 is connected to positive potential through resistor 53. The cathode of pentode 40 and the cathode of triode 50 are connected together to ground through a common resistor 54.

The plate of rectifier 38 is connected to a source of negative potential through resistor 55 and is also connected through resistor 56 to the control grid of phase inverter triode 60. The cathode of triode 60 is connected to ground through resistor 61. The plate of triode 60 is connected to positive potential through resistor 62. The plate of triode 60 is connected through condenser 63 to the control grid of pentode 70 and to resistor 64. The other end of resistor 64 is connected to ground through resistor 65 and to a source of positive potential through resistor 66.

The suppressor grid of pentode 70 is connected to the plate of pentode 40 through condenser 71 and to a source of positive potential through resistor 75. The screen grid of pentode 70 is connected through resistor 72 to a source of positive potential and to ground through resistor 77. The plate of pentode 70 is connected to positive potential through resistor 73. The plate of pentode 70 is also connected through condenser 74 to the control grid of triode 80. Pentode 70 and triode 80 with its associated circuitry form a second monostable multivibrator 81. The control grid of triode 80 is also connected to positive potential through resistor 76. The plate of triode 80 is connected to positive potential through resistor 82. The cathode of pentode 70 and the cathode of triode 80 are connected to ground through a common resistor 83. The plate of pentode 70 is also connected through condenser 84 to both the suppressor grid of pentode 40 and to a source of positive potential through resistor 85. The rectifiers 36 and 38, monostable multivibrators 51 and 81 and phase inverter 60 form gate generator 17. The output of the gate generator 17 is taken from the plate of triode 50 which is connected through series condenser 86 and series resistor 87 to the cathode of diode 90. The cathode of diode 90 is also connected to ground through resistor 91. The plate of diode 90 is connected through resistor 92 to the output of amplifier 16. The input of amplifier 16 is connected to a permanent magnet reluctance pick-up 93 which has one terminal grounded. The permanent magnet reluctance pick-up 93 or other suitable signal generating device is fixedly mounted closely adjacent to the periphery of engine flywheel 94 to initiate a signal for each engine revolution. In a preferred embodiment, a punch mark or projection 95 is mounted on the engine flywheel 94 thereby initiating a signal in the pickup 93 for every revolution of the flywheel.

The plate of diode 90 is also connected to the control grid of triode 96 which is also connected to ground through resistor 97. The cathode of triode 96 is connected to ground through resistor 98. The plate of triode 96 is connected to the input of the sweep generator 13 the output of which is connected to a source of positive potential through resistor 99 and to the horizontal deflection plates 12 of the cathode ray tube 10 as previously mentioned. The diode 90 and the triode 96 with their associated circuitry form a gated amplifier or coincidence circuit 15.

Referring again to FIG. 1, the operation of the system will now be described. For purposes of illustration, the characteristic engine operation signal that is applied to the vertical deflection plates 11 is shown as an ignition signal. However, it is to be understood that any other characteristic engine operation signal could be applied in a similar manner. The positive and negative ignition signals are applied to the gate generator 17. The signals are supplied from a magneto and for purposes of example the invention is applied to a four-stroke cycle six-cylinder engine having dual ignition with two magnetos. The output signals from any one of the magnetos are spaced by 120° such that there are six output signals in two crank shaft revolutions or one engine cycle. The magnetos are so constructed that the initial polarity of voltage applied to any one spark plug (and thus the polarity of signal that appears across the breaker points when that plug fires) will remain the same. Assume the firing order of the cylinders to be 1, 5, 3, 6, 2, 4 and the corresponding initial polarities of the ignition signals are minus, plus, minus, plus, minus, plus. A pulse pick-up operably coupled to the flywheel that is actuated, for example, at every top dead center (TDC) of the number 1 cylinder will initiate two synchronizing signal pulses for every engine cycle, i.e. one per flywheel revolution. The problem of synchronization is that of deriving from the engine sufficient information to identify position in the engine cycle. This is accomplished by recognizing that although there is a synchronizing signal from the pulse pickup at each TDC of cylinder number 1, only one of these signals is immediately preceded by a positive ignition signal. This information may be utilized to enable the sweep generator 13 to respond only to the predetermined flywheel synchronizing signal of the desired polarity that occurs at combustion TDC of cylinder number 1 so that the sweep will always begin at this point. The ignition signals may then be fed to a gate generator 17, the output of which is a gating signal responding to positive signals only, for example, that actuates a gated amplifier 15. The synchronizing signal after being amplified by amplifier 16 is also connected to the gated amplifier 15 and when the gating signal and the synchronizing signal are in proper time relationship, a triggering signal is connected to the sweep generator 13 which initiates in generator 13 a synchronized sweep that is applied to the horizontal deflection plates 12 of the cathode ray tube 10 such that the sweep always begins at a particular point in the engine cycle.

Referring now to FIG. 2, for a more detailed explanation, the ignition signals are applied to rectifiers 36 and 38. The ignition signals from the magneto primary 21 are the result of a discharge of an inductance and, therefore, although they have a desired peak of a particular polarity, portions of the final damped oscillations enter into the opposite polarity. Thus, for example, a signal that is initially positive will have a subsequent negative polarity component and vice versa. It is desirable to use only the initial portion of the ignition signal and make the system unresponsive to the subsequent portion of the opposite polarity. This is accomplished in a manner to be described by the gate generator 17. Diode 36 will conduct for initially positive signals and diode 38 will conduct for initially negative signals. Consider an ignition signal which is initially positive provided by the firing of number four cylinder. Rectifier 36 will conduct and the potential of the control grid of pentode 40 is raised such that pentode 40 of monostable multivibrator 51 immediately conducts dropping the plate voltage thereof and immediately cutting off pentode 70 of monostable multivibrator 81. This prevents the negative portion of the initially positive ignition signal from number four spark plug which would be passed by rectifier 38 from firing pentode 70. In the operation of monostable multivibrators 51 and 81 the triodes 50 and 80 are normally conducting while the pentodes 40 and 70 are normally in a nonconducting state until made conductive by positive or negative ignition signals, respectively.

The time constant of multivibrator 51 is selected such that pentode 40 will remain in conduction over the major activating portion of the ignition signal from number four cylinder. Pentode 40 then ceases to conduct before the next ignition signal is received from the magneto primary 21 at the rectifiers 36 and 38. The next ignition signal which has an initial negative polarity passes through rectifier 38 to the phase inverter triode 60. The output of the phase inverter 60 puts the pentode 70 of multivibrator 81 into conduction. The conduction of pentode 70 causes a decrease in potential at the plate of pentode 70 and, since it is connected back to the suppressor grid of pentode 40, it holds pentode 40 at cut-off so that pentode 40 will not respond to the positive portion of the initially negative ignition signal.

During the conduction of pentode 40 due to a positive ignition signal, the triode 50 is cut off and consequently the potential at the plate of triode 50 is increased. The increased potential at the plate of triode 50 serves to cut off diode 90. In its conducting state, diode 90 shunts the engine synchronizing signals from the pick-up 93 on the flywheel 94 to ground. As previously explained, a gating signal appears on the output of the plate of triode 50 after a positive ignition signal has been applied to multivibrator 51. The gating signal from the plate of triode 50 cuts off the diode 90 and allows the synchronizing signal to be connected directly to the grid of triode 96. The output of the triode 96 then triggers the sweep generator 13. Thus, a synchronizing signal is only connected to trigger the sweep circuit after a positive ignition signal has been applied through rectifier 36 and multivibrator 51 and a synchronizing signal is present after a positive ignition signal only once for every other engine revolution i.e. for each engine cycle.

Figure 3:
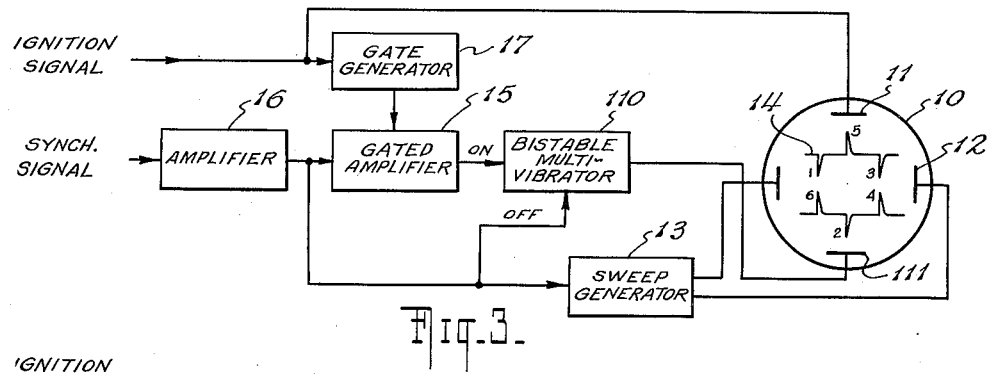
FIG. 3 is a block schematic diagram of an alternative engine analyzing system.

An alternative embodiment of the present invention is indicated in FIG. 3 where the ignition signals are applied to one of the vertical deflection plates 11 of cathode ray tube 10. The ignition signal is also applied to a gate generator 17 similar to that of FIG. 1. Synchronizing signals from a suitable pick-up (not shown) responsive to each engine revolution are connected to an amplifier 16 and thence to a gated amplifier or coincidence circuit 15 similar to the one shown in FIG. 1. The gated amplifier 15 is connected to a bistable multivibrator 110. The output of bistable multivibrator 110 is connected to the other vertical deflection plate 111 of the cathode ray tube 10. The amplifier 16 is connected to provide a second input to the bistable multivibrator 110. The amplifier 16 is also connected to the sweep generator 13 and the output of the sweep generator 13 is connected to the horizontal deflection plates 12 of the cathode ray tube 10.

The operation of the embodiment of FIG. 3 is similar with regard to the gate generator 17 and the gated amplifier 15 as the operation of FIG. 1. The intent is to obtain a sweep for every engine revolution but to displace the patterns vertically on the scope face so that they may be identified as to cylinder position. To do this a pulse pick-up which provides a synchronizing signal similar to the one described for use in FIG. 2 may be used to trigger the horizontal sweep generator 13 for every engine revolution. The output of the gated amplifier 15, which is the same output as described for FIG. 2, is applied to a bistable multivibrator 110 which when connected to one of the vertical deflection plates 111 of the cathode ray tube 10 acts as a bias control means. The gated synchronizing signal or trigger signal, similar to that of FIG. 1, results in the conduction of one of the tubes of the bistable multivibrator 110 causing, for example, an increase in negative potential on the lower plate 111 of the vertical deflection plates of the cathode ray tube 10 which elevates the sweep pattern 14 on the tube face. The next pulse pick-up signal which is ungated is introduced to the other tube of the bistable multivibrator 110. This puts the other tube into conduction and thereby lowers the potential on the lower deflection plate 111 which lowers the sweep pattern 14. In this way the dual sweep pattern is achieved and a plurality of sweep patterns are obtainable in which identification of the cylinders is possible since a particular cylinder signal will always appear at the same location.

Figure 4:
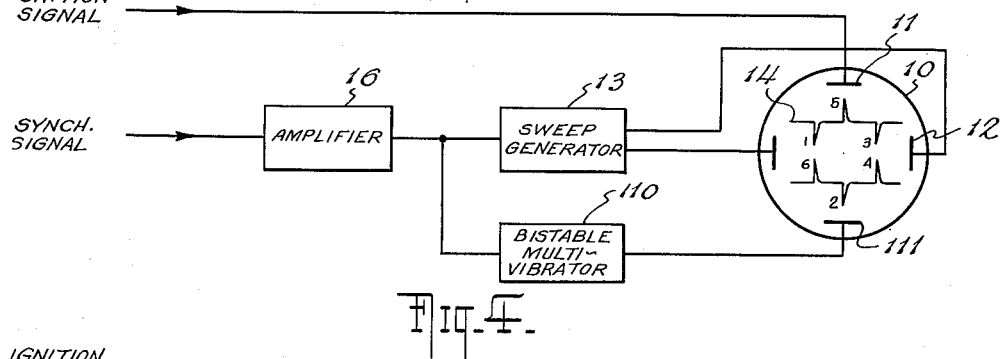
FIG. 4 is a block schematic diagram of an alternative engine analyzing system.

FIG. 4 shows another embodiment of the invention in which the ignition signal is applied to the upper vertical deflection plate 11 of cathode ray tube 10. Synchronizing signals are applied through an amplifier 16 and sweep generator 13 of the type previously discussed to the horizontal deflection plates 12 of the cathode ray tube 10. The output of the amplifier 16 is connected through a bistable multivibrator 110 to the lower vertical deflection plate 111 of cathode ray tube 10.

In the operation of the system of FIG. 4, the synchronizing signal is used to trigger the horizontal sweep generator 13 for every engine revolution as in FIG. 3. The synchronizing signal is applied to both tubes of the bistable multivibrator 110. In the embodiment of the invention shown in FIG. 4, the diodes in the multivibrator 110 will only conduct to the plate of the cut-off tube since the diode of the conducting tube is biased in the reverse direction by the lower plate voltage of the heavily conducting tube. In this way, the sweep pattern 14 is shifted vertically, once for each engine revolution. Identification of the patterns by cylinders is accomplished in this display by knowledge that 1—5—3 will always appear as negative-positive-negative, and 6—2—4 as positive-negative-positive; however, if it is desired to maintain a particular cylinder signal at a particular location in the embodiment of FIG. 4, a manual selection of either one or the other of the outputs of the multivibrator 110 is required, as shown in FIG. 5.

Figure 5:
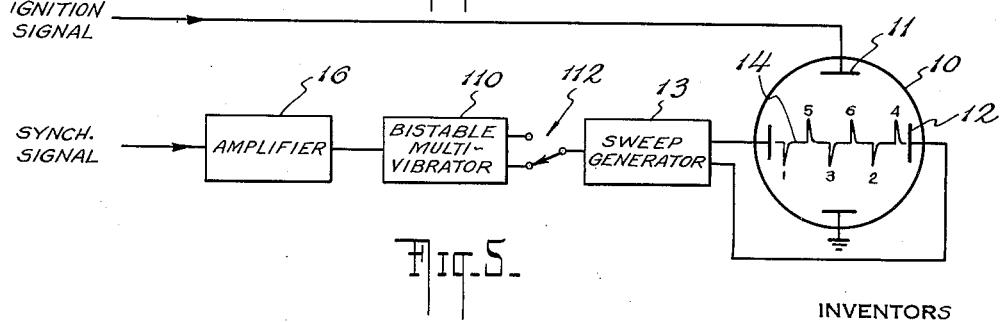
FIG. 5 is a block schematic diagram of an alternative engine analyzing system.

In FIG. 5 another embodiment is shown in which the ignition signals are again applied to the upper vertical deflection plate 11 of the cathode ray tube 10. The synchronizing signal is connected to the amplifier 16 which in turn is connected to the input of a bistable multivibrator 110. The output of bistable multivibrator 110 is connected through a switching device 112 through the sweep generator 13 which in turn is coupled to the horizontal deflection plates 12 of the cathode ray tube 10.

In the embodiment of FIG. 5 the synchronizing signal is inserted into the input of bistable multivibrator 110 shown in FIG. 4. In order to provide a sweep for every other engine revolution, the plate of only one of the tubes of the multivibrator 110 is connected to the sweep generator 13. A manual switch 112 makes it possible to select the plate of either tube manually in order that the sweep pattern 14 may be initiated at a particular cylinder as there is one chance in two that the desired phasing would be obtained from the multivibrator output, the desired phasing being recognized as that in which the first pattern is negative.

The pulse pick-up 93 is illustrated as a permanent magnet reluctance type pick-up. Any other type of pick-up that would provide the necessary synchronizing signal would be acceptable and may be taken from any portion of the engine which provides one signal for each revolution of the engine. The number of stages of amplification of the pick-up synchronizing signal is dependent upon the type pick-up used.

The sweep generating circuits are conventional and may consist, for example, of an isolating stage, thyratron and push-pull output or may contain whatever modifications may be necessary to provide the sweep in the particular situation.

This system does not preclude the use of timing pulses for scope face presentation being handled by the same signal pick-up, for within the limits of signal configuration, it is possible to design the circuitry to respond only to one particular signal for sweep generation, but to all signals for scope face presentation. It should be noted that although the invention has been described in relation to a six-cylinder internal combustion engine, obvious variations of the proposed methods may be utilized for engines having different firing orders and cylinder bank configurations.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. An engine analyzer having a cathode ray tube with first and second deflection means, ignition signal generating means for providing characteristic ignition signals, means operably coupling the ignition signal generating means to the first deflection means of the cathode ray tube, gate generator means responsive to predetermined ignition signals for providing a gating pulse in accordance therewith, pick-up means for providing synchronizing signals in accordance with engine revolutions, sweep voltage generating means operably coupled to the second deflection means, and gated control means responsive to the gating pulses and to the synchronizing signals for selectively triggering said sweep voltage generating means only when a gating pulse and a synchronizing signal coincide whereby a characteristic ignition pattern is displayed.

2. Apparatus for testing the ignition system of an internal combustion engine including an oscilloscope having first and second deflection means, means for connecting said first deflection means of the oscilloscope to the ignition system so as to receive ignition signals and give indications representing the signals delivered to the spark plugs, gate generating means responsive to predetermined ignition signals for providing a gating signal, pick-up means operably coupled to said engine for generating a synchronizing signal per engine revolution, gating means responsive to said synchronizing signal and to said gating signal for providing a triggering signal when said synchronizing and gating signals are synchronized, and sweep generating means responsive to said triggering signals and connected to said second deflection means for producing a sweep on said oscilloscope synchronized with each engine cycle.

3. Apparatus as claimed in claim 2 including means for rendering said gate generating means responsive to the positive portion of initially positive ignition signals and unresponsive to the positive portion of initially negative ignition signals.

4. Apparatus as claimed in claim 2 including means for rendering said gating means normally conductive for shunting said synchronizing signal to ground and rendering said gating means non-conductive by said coincidence of said gating and synchronizing signals thereby providing a triggering signal for said sweep generator.

5. An engine analyzer for testing the operation of an internal combustion engine including a cathode ray tube having vertical and horizontal deflection plates, means for generating signals characteristic of said engine operation, means for connecting the vertical deflection plates of said tube to receive said characteristic signals and to give indications representing said characteristic signals, first rectifying means connected to the ignition apparatus and responsive thereto for providing an output in accordance with the positive portion of ignition signals, second rectifying means connected to the ignition apparatus and responsive thereto for providing an output in accordance with the negative portion of ignition signals, a first monostable multivibrator having first and second electronic discharge devices, a second monostable multivibrator having third and fourth electronic discharge devices, each of said electronic discharge devices having at least an electron emitting electrode, a first control electrode and an electron collecting electrode, each of said first and third electronic discharge devices having a second control electrode, the first control electrode of said first electronic discharge device is operably coupled to said first rectifying means and responsive to the output therefrom, the electron collecting electrode of said first electronic discharge device is operably coupled to the control electrode of said second electronic discharge device forming a first junction therebetween, said first junction is operably coupled to the second control electrode of said third electronic discharge device, the electron collecting electrode of said third electronic discharge device is operably coupled to the control electrode of said fourth electronic discharge device forming a second junction therebetween, said second junction is operably coupled to the second control electrode of said first electronic discharge device, polarity reversing means is operably coupled to said second rectifying means for providing an output signal of opposite polarity with respect to that from said second rectifying means, said polarity reversing means is operably coupled to the first control electrode of said third electronic discharge device, conductor means connected to the electron collecting electrode of said second electronic discharge device for providing a gating signal, pick-up means operably coupled to said engine for generating a synchronizing signal for each engine revolution, gating means responsive to said sychronizing signal and to said gating signal for providing a triggering signal when said synchronizing and gating signals are synchronized, and sweep generating means responsive to said triggering signal and connected to the horizontal deflection plates of said tube for producing a sweep on said tube synchronized with the engine cycle.

6. In an engine analyzer, a first analyzer input adapted for connection to a signal generator on an internal combustion engine supplying a plurality of signals during each engine revolution, said signals being characteristic of engine performance, a second analyzer input adapted for connection to a synchronizing signal pick-up coupled to said engine, said pick-up supplying at least one synchronizing signal for each engine revolution, a display means having vertical and horizontal deflection means, said first input being connected to said vertical deflection means and also to the input of a gate generator arranged to provide a gate signal at its output upon the application to its input of an engine-characteristic signal having a predetermined initial polarity, a coincidence circuit having two inputs and an output, said coincidence circuit being arranged to provide a signal at its output only when a signal is applied to each of said two inputs simultaneously, means connecting said second analyzer input to one input of said coincidence circuit, means connecting the output of said gate generator to the other input of said coincidence circuit, a sweep generator having an output and an input and arranged to provide a sweep wave upon the application of a signal to its input, means connecting the output of said coincidence circuit to the input of said sweep generator, and means connecting the output of said sweep generator to said horizontal deflection means, whereby the horizontal deflection means of said display means is provided with a sweep wave each time a synchronizing signal coincides with an engine-characteristic signal having a predetermined initial polarity.

7. In combination, an internal combustion engine having a signal generator for supplying a plurality of signals during each engine revolution, said signals being characteristic of engine performance, a signal pick-up coupled to said engine for supplying at least one synchronizing signal for each engine revolution, a display means having vertical and horizontal deflection means, said engine performance signals being connected to said vertical deflection means and also to the input of a gate generator arranged to provide a gate signal at its output upon the application to its input of an engine-characteristic signal having a predetermined initial polarity, a coincidence circuit having two inputs and an output and being arranged to provide a signal at its output only when a signal is applied to each of said two inputs simultaneously, means connecting said synchronizing signals to one input of said coincidence circuit, means connecting the output of said gate generator to the other input of said coincidence circuit, a sweep generator having an output and an input and arranged to provide a sweep wave upon the application of a signal to its input, means connecting the output of said coincidence circuit to the input of said sweep generator, and means connecting the output of said sweep generator to said horizontal deflection means, whereby the horizontal deflection means of said display means is provided with a sweep wave each time a synchronizing signal coincides with an engine characteristic signal having a predetermined initial polarity.

8. In an engine analyzer, a gate generator comprising a first rectifying means for providing an output in accordance with positive signals, a second rectifying means for providing an output in accordance with negative signals, a first monostable multivibrator having first and second electronic discharge devices, a second monostable multivibrator having third and fourth electronic discharge devices, each of said electronic discharge devices having at least an electron emitting electrode, a first control electrode and an electron collecting electrode, each of said first and third electronic discharge devices having a second control electrode, the first control electrode of said first electronic discharge device is operably coupled to said first rectifying means and responsive to the output therefrom, the electron collecting electrode of said first electronic discharge device is operably coupled to the control electrode of said second electronic discharge device forming a first junction therebetween, said first junction is operably coupled to the second control electrode of said third electronic discharge device, the electron collecting electrode of said third electronic discharge device is operably coupled to the control electrode of said fourth electronic discharge device forming a second junction therebetween, said second junction is operably coupled to the second control electrode of said first electronic discharge device, a polarity reversing means is operably coupled to said second rectifying means for providing an output signal of opposite polarity with respect to that from said second rectifying means, said polarity reversing means is operably coupled to the first control electrode of said third electronic discharge device, and conductor means connected to the electron collecting electrode of said second electronic discharge device for providing a gating signal whereby the gate generator provides a gating signal in response to the positive portion of initially positive input signals and is unresponsive to the positive portion of initially negative input signals.

9. A gate generator comprising a first rectifying means for providing an output in accordane with positive signals, a second rectifying means for providing an output in accordance with negative signals, a first monostable multivibrator having a first pentode and a first triode, a second monostable multivibrator having a second pentode and a second triode, the control grid of said first pentode is operably coupled to said first rectifying means and responsive to the output therefrom, the plate of said first pentode is operably coupled to the control grid of said first triode forming a first junction therebetween, said first junction is operably coupled to the suppressor grid of said second pentode, the plate of said second pentode is operably coupled to the control grid of said second triode forming a second junction therebetween, said second junction is operably coupled to the suppressor grid of said first pentode, a polarity reversing means is operably coupled to said second rectifying means for providing an output signal of opposite polarity with respect to that from said second rectifying means, said polarity reversing means is operably coupled to the control grid of said second pentode and conductor means connected to the plate of said first triode for providing a gating signal whereby the gate generator provides a gating signal in response to the positive portion of primarily positive input signals and is unresponsive to the positive portion of primarily negative input signals.

10. A method of analyzing the operation of the ignition system of an internal combustion engine with a cathode ray tube having horizontal and vertical deflection plates including the steps of generating one synchronizing signal for each engine revolution, generating ignition signals representing the signals delivered to the spark plugs of said engine, supplying said ignition signals to the vertical deflection plates of said tube, gating a triggering means in accordance with a particular portion of a predetermined ignition signal, triggering a sweep generating means connected to the horizontal deflection plates in accordance with synchronized ignition and synchronizing signals, and producing a sweep on said tube whereby a characteristic ignition pattern is displayed thereon.

References Cited in the file of this patent

UNITED STATES PATENTS

| | | |
|---|---|---|
| 2,607,215 | De Boisblanc | Aug. 19, 1952 |
| 2,624,044 | Schooley | Dec. 30, 1952 |
| 2,645,751 | Byerlay | July 14, 1953 |
| 2,688,126 | Weller | Aug. 31, 1954 |
| 2,740,069 | Minto | Mar. 27, 1956 |
| 2,750,563 | Winter | June 12, 1956 |
| 2,785,215 | Yetter | Mar. 12, 1957 |
| 2,787,726 | Benoit | Apr. 2, 1957 |
| 2,791,745 | Ramsay | May 7, 1957 |
| 2,867,766 | Broder et al. | Jan. 6, 1959 |
| 2,907,948 | Sackett | Oct. 6, 1959 |
| 2,948,857 | Welcome | Aug. 9, 1960 |